United States Patent
Jo et al.

(10) Patent No.: US 12,431,570 B2
(45) Date of Patent: Sep. 30, 2025

(54) BATTERY MODULE HAVING PARTITION WALL AND THERMAL INSULATION LAYER FOR FIRE INHIBITION

(71) Applicant: LG ENERGY SOLUTION, LTD., Seoul (KR)

(72) Inventors: Sang Hyun Jo, Daejeon (KR); Jin Kyu Shin, Daejeon (KR); Sung Goen Hong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 551 days.

(21) Appl. No.: 17/800,737

(22) PCT Filed: Apr. 22, 2021

(86) PCT No.: PCT/KR2021/005070
§ 371 (c)(1),
(2) Date: Aug. 18, 2022

(87) PCT Pub. No.: WO2022/004997
PCT Pub. Date: Jan. 6, 2022

(65) Prior Publication Data
US 2023/0099554 A1 Mar. 30, 2023

(30) Foreign Application Priority Data
Jun. 29, 2020 (KR) .................. 10-2020-0079313

(51) Int. Cl.
*H01M 50/24* (2021.01)
*H01M 10/04* (2006.01)
(Continued)

(52) U.S. Cl.
CPC ....... *H01M 50/24* (2021.01); *H01M 10/0472* (2013.01); *H01M 50/143* (2021.01);
(Continued)

(58) Field of Classification Search
None
See application file for complete search history.

(56) References Cited

U.S. PATENT DOCUMENTS

2012/0028099 A1  2/2012  Aoki
2012/0114985 A1  5/2012  Kim et al.
(Continued)

FOREIGN PATENT DOCUMENTS

CN  104733667 A  6/2015
CN  204760454 U  11/2015
(Continued)

OTHER PUBLICATIONS

Machine translation of JP2014235803 (Year: 2025).*
International Search Report (PCT/ISA/210) issued in PCT/KR2021/005070, dated Aug. 6, 2021.

*Primary Examiner* — Brian R Ohara
*Assistant Examiner* — M. T. Leonard
(74) *Attorney, Agent, or Firm* — Birch, Stewart, Kolasch & Birch, LLP

(57) ABSTRACT

A battery module includes a partition wall and a thermal insulation layer for thermal runaway prevention, and more particularly a battery module is configured such that a cell module assembly includes two or more cell stacks, in each of which a plurality of battery cells is stacked in a vertical direction, is received in a space portion defined in a protective case and such that one more partition walls are provided in at least one of between neighboring ones of the cell stacks and between the cell stacks and the protective case.

20 Claims, 15 Drawing Sheets

(51) Int. Cl.
  *H01M 50/143* (2021.01)
  *H01M 50/209* (2021.01)
  *H01M 50/289* (2021.01)
  *H01M 50/507* (2021.01)

(52) U.S. Cl.
  CPC ....... *H01M 50/209* (2021.01); *H01M 50/289* (2021.01); *H01M 50/507* (2021.01)

(56) References Cited

U.S. PATENT DOCUMENTS

| | | | |
|---|---|---|---|
| 2012/0115011 A1 | 5/2012 | Kim | |
| 2013/0288099 A1* | 10/2013 | Kim | H01M 50/30 429/120 |
| 2017/0331079 A1* | 11/2017 | Yu | H01M 50/138 |
| 2018/0190955 A1 | 7/2018 | Motohashi et al. | |
| 2019/0181405 A1 | 6/2019 | Kim et al. | |
| 2020/0035975 A1 | 1/2020 | Cho et al. | |
| 2020/0350548 A1 | 11/2020 | Nishimori | |
| 2020/0411816 A1 | 12/2020 | Yoneyama | |
| 2022/0376355 A1* | 11/2022 | Gang | H01M 50/209 |

FOREIGN PATENT DOCUMENTS

| | | | | |
|---|---|---|---|---|
| CN | 110959203 A | | 4/2020 | |
| CN | 111742423 A | | 10/2020 | |
| EP | 2 290 728 A1 | | 3/2011 | |
| JP | 2002-245993 A | | 8/2002 | |
| JP | 2007-42453 A | | 2/2007 | |
| JP | 2012-33306 A | | 2/2012 | |
| JP | 2012-99477 A | | 5/2012 | |
| JP | 2012-164463 A | | 8/2012 | |
| JP | 2013-251127 A | | 12/2013 | |
| JP | 2014-235803 A | | 12/2014 | |
| JP | 2015-79564 A | | 4/2015 | |
| JP | 2015-118799 A | | 6/2015 | |
| JP | 2017-10778 A | | 1/2017 | |
| JP | 2018-129240 A | | 8/2018 | |
| JP | 2019-149227 A | | 9/2019 | |
| KR | 10-2019-0069873 A | | 6/2019 | |
| KR | 10-2020-0011816 A | | 2/2020 | |
| KR | 10-2020-0044423 A | | 4/2020 | |
| KR | 1020210037359 A | * | 4/2021 | .......... H01M 50/209 |
| WO | WO 2019/031175 A1 | | 2/2019 | |

* cited by examiner

[FIG. 1]
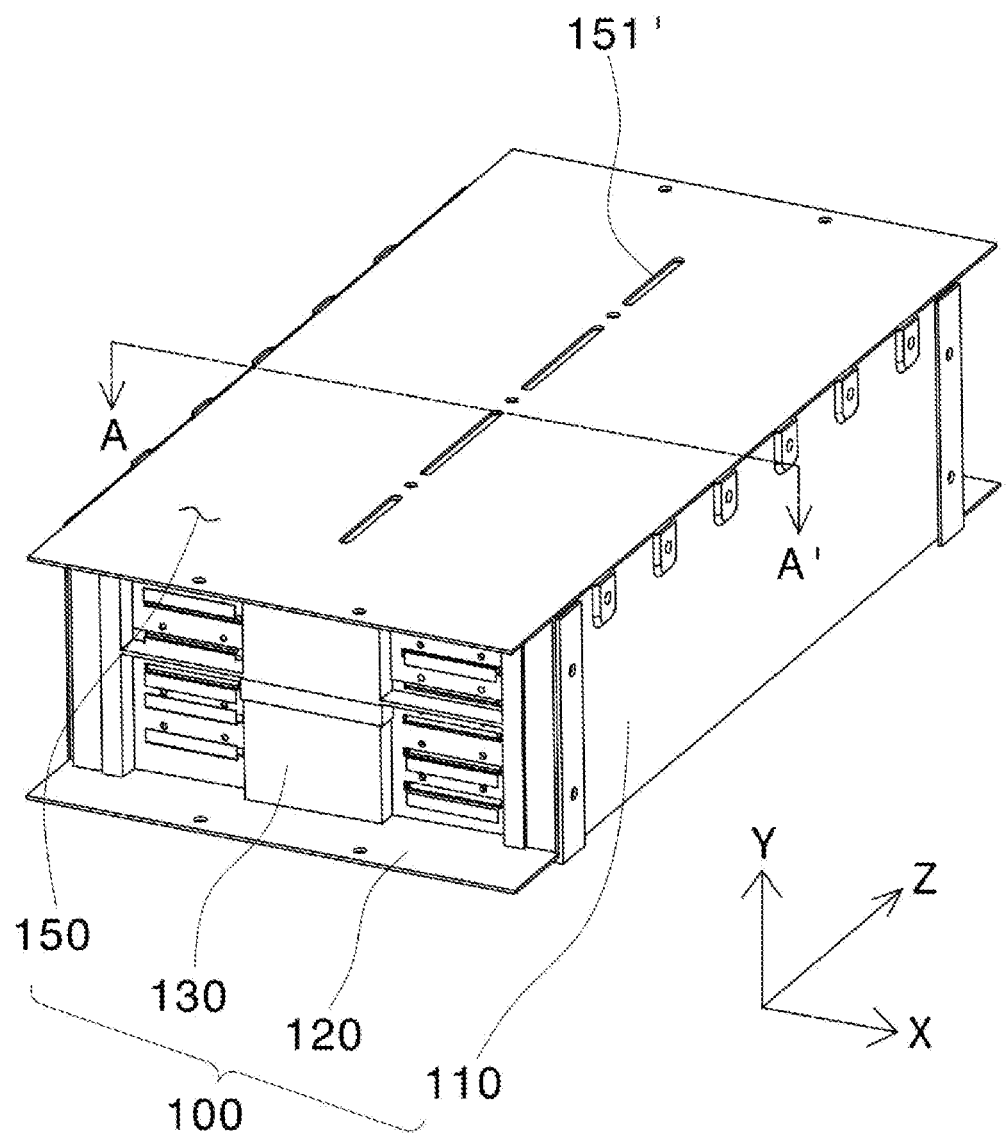

[FIG. 2]
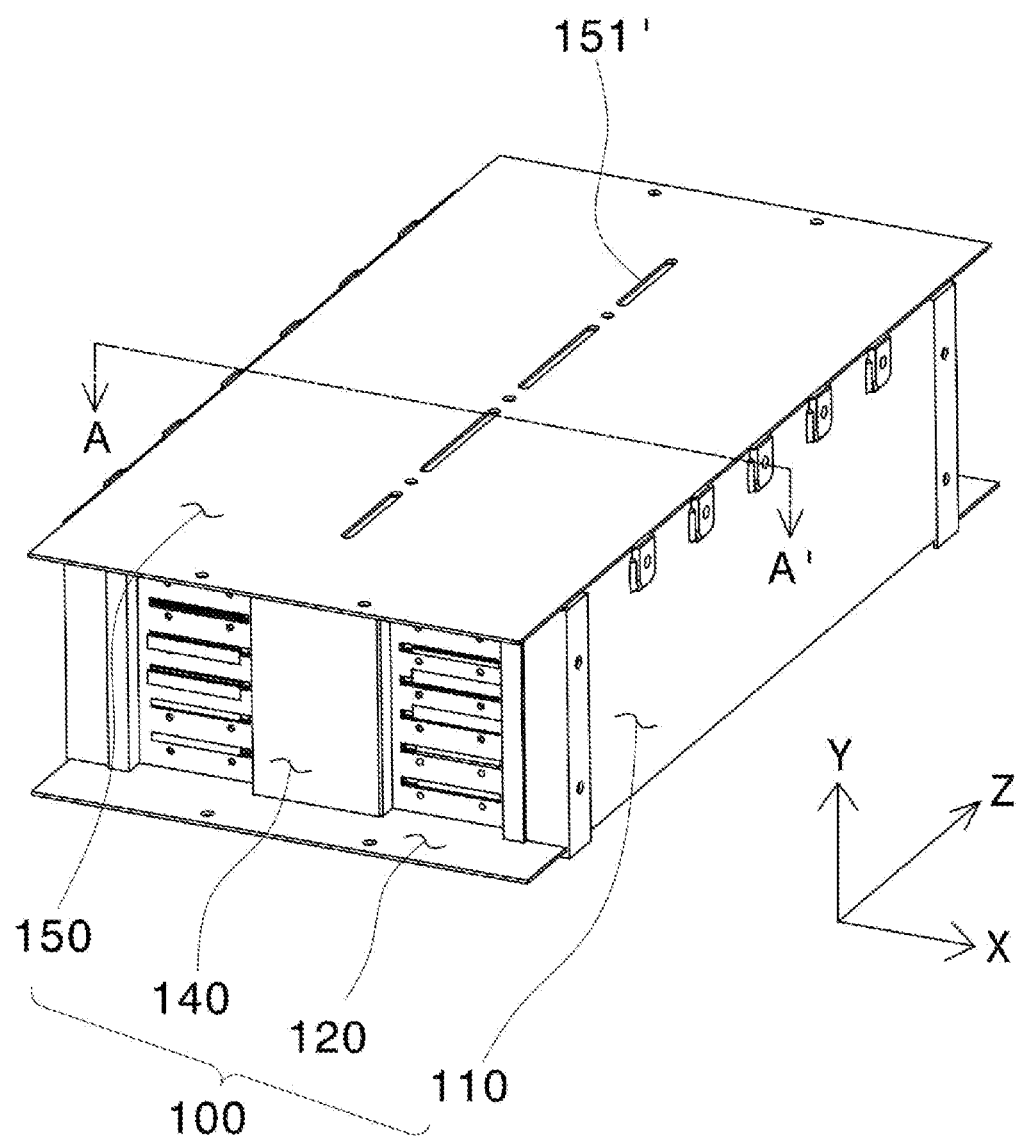

[FIG. 3]
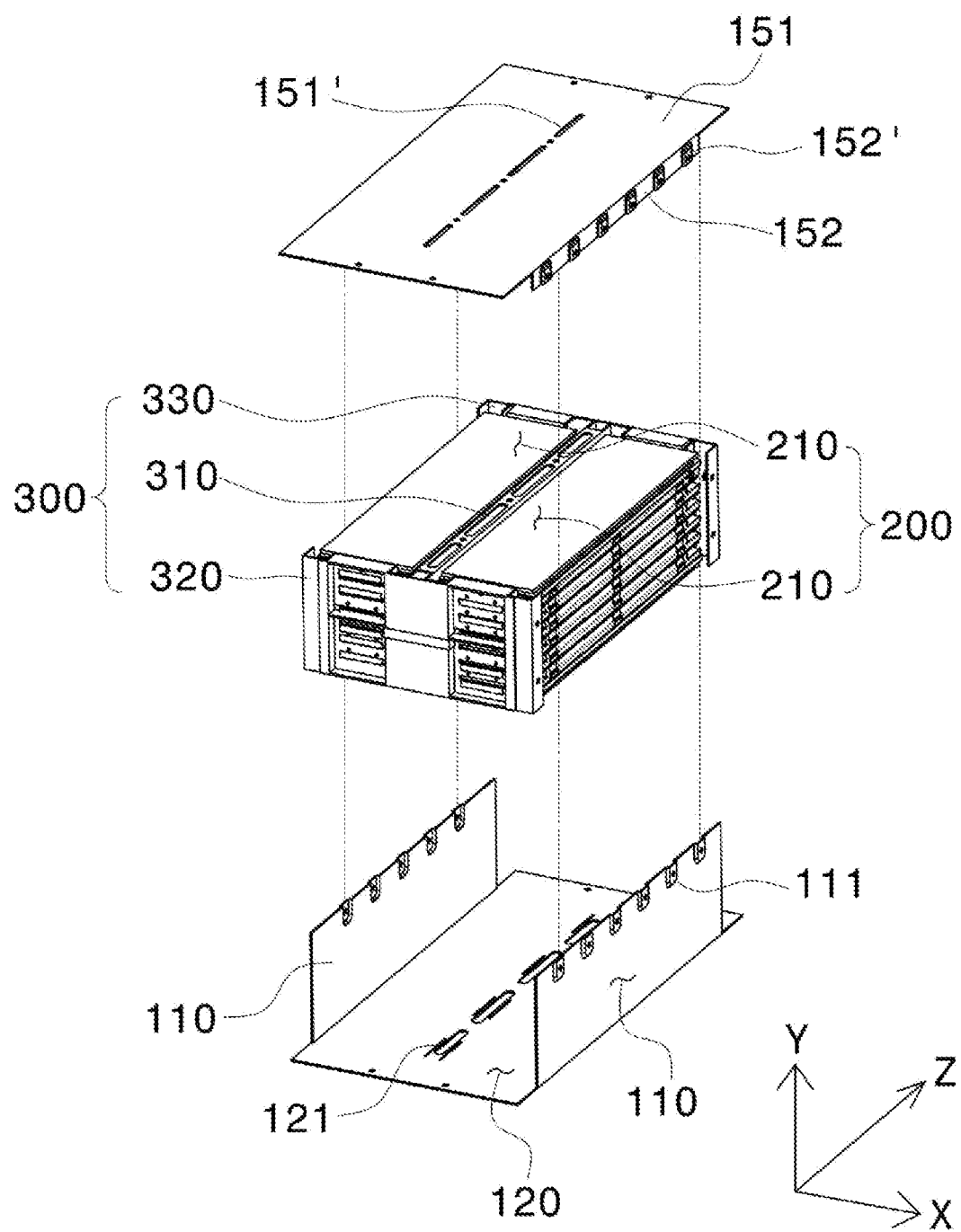

[FIG. 4]
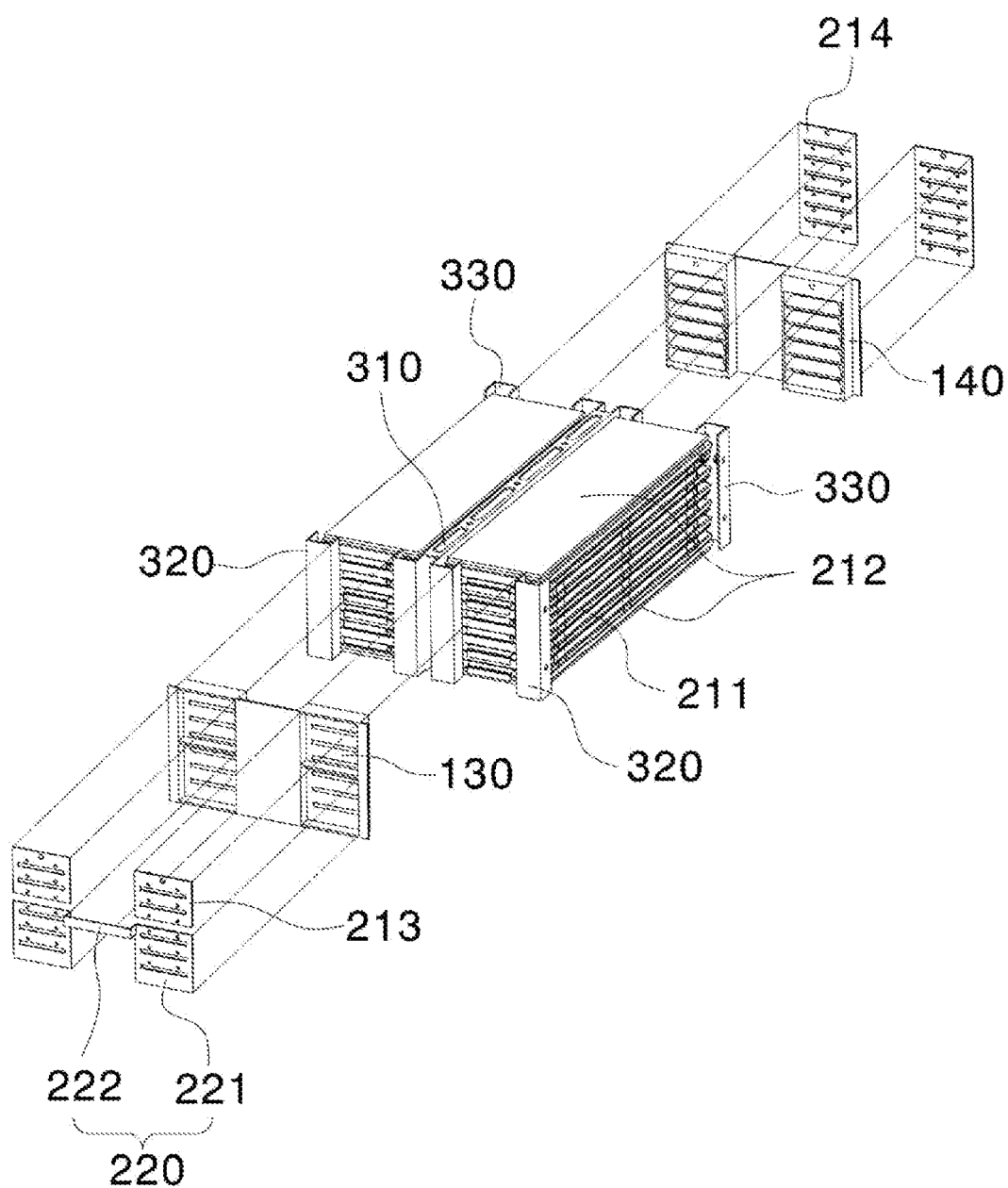

【FIG. 5】
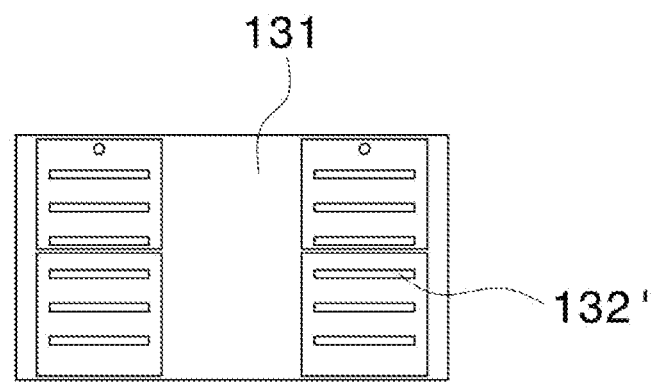
(a)
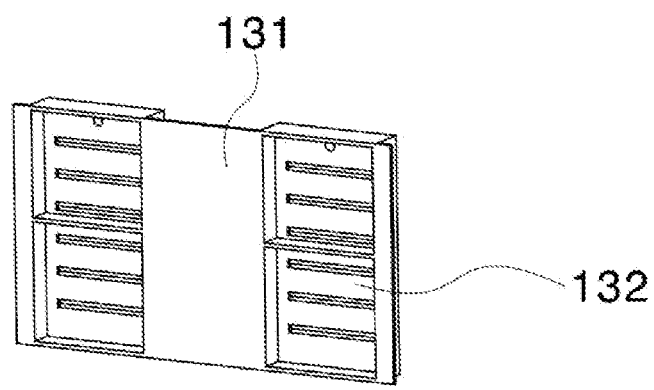
(b)
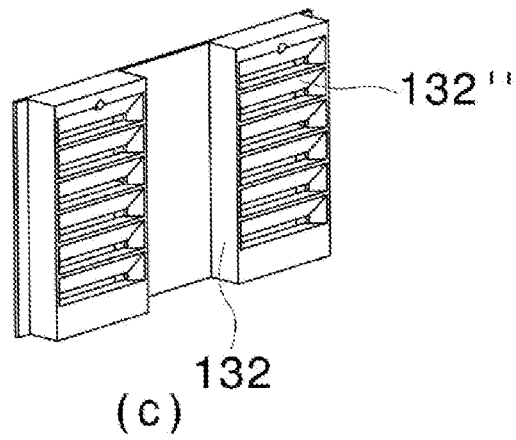
(c)

[FIG. 6]
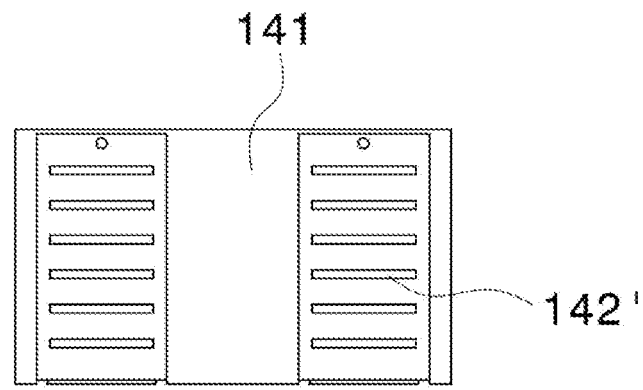
(a)
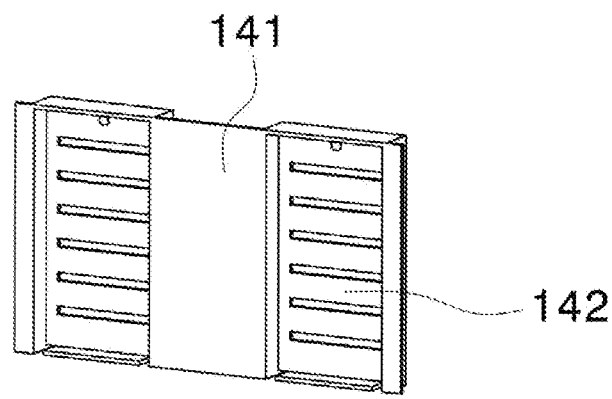
(b)
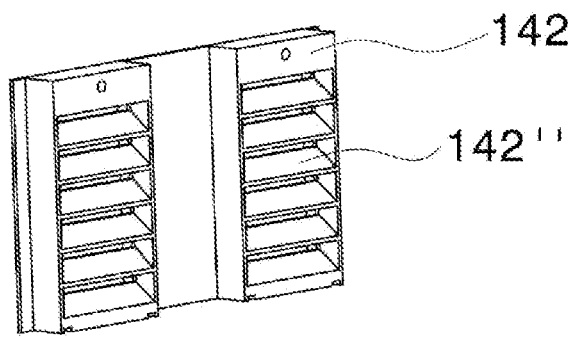
(c)

[FIG. 7]
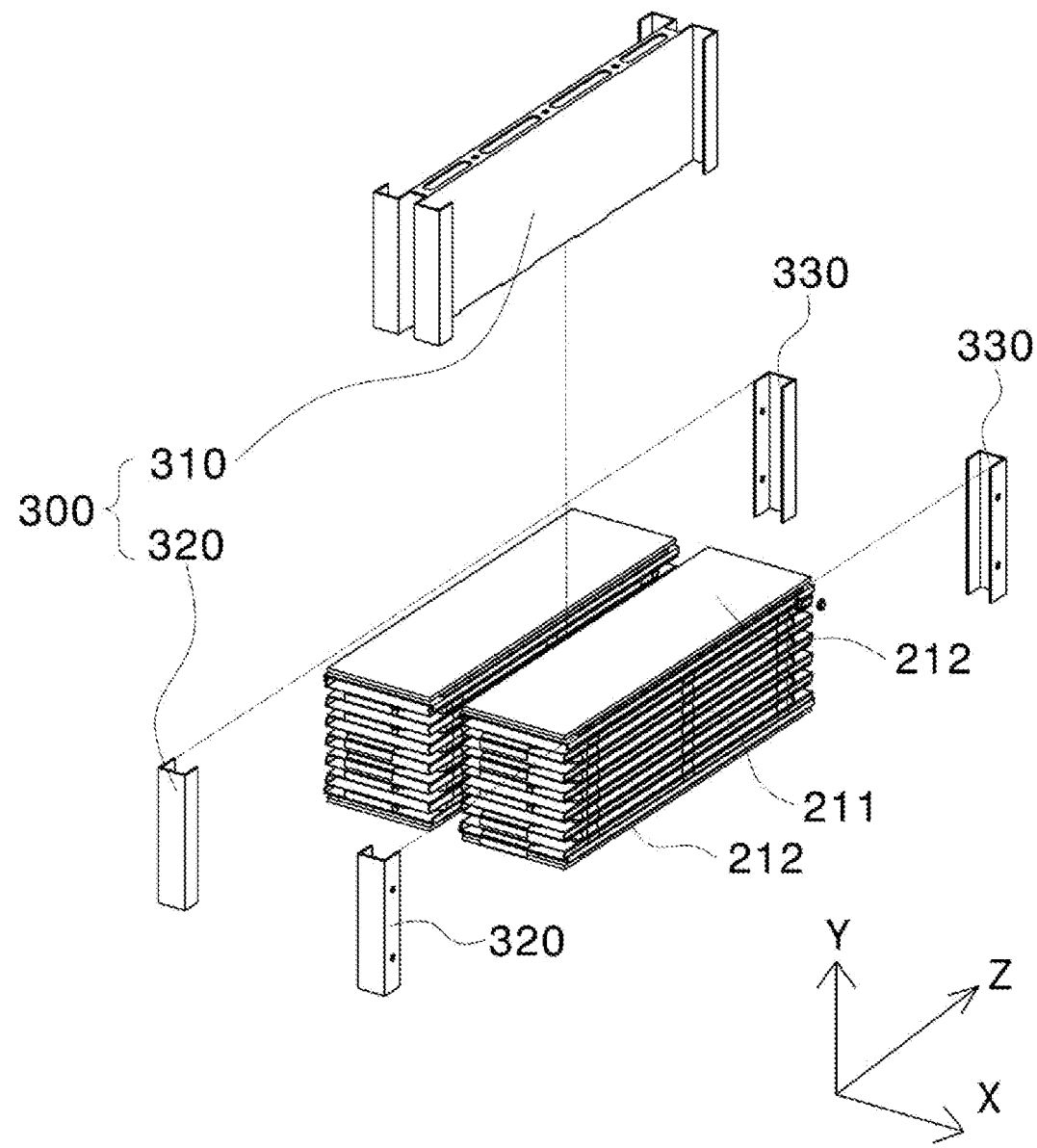

[FIG. 8]
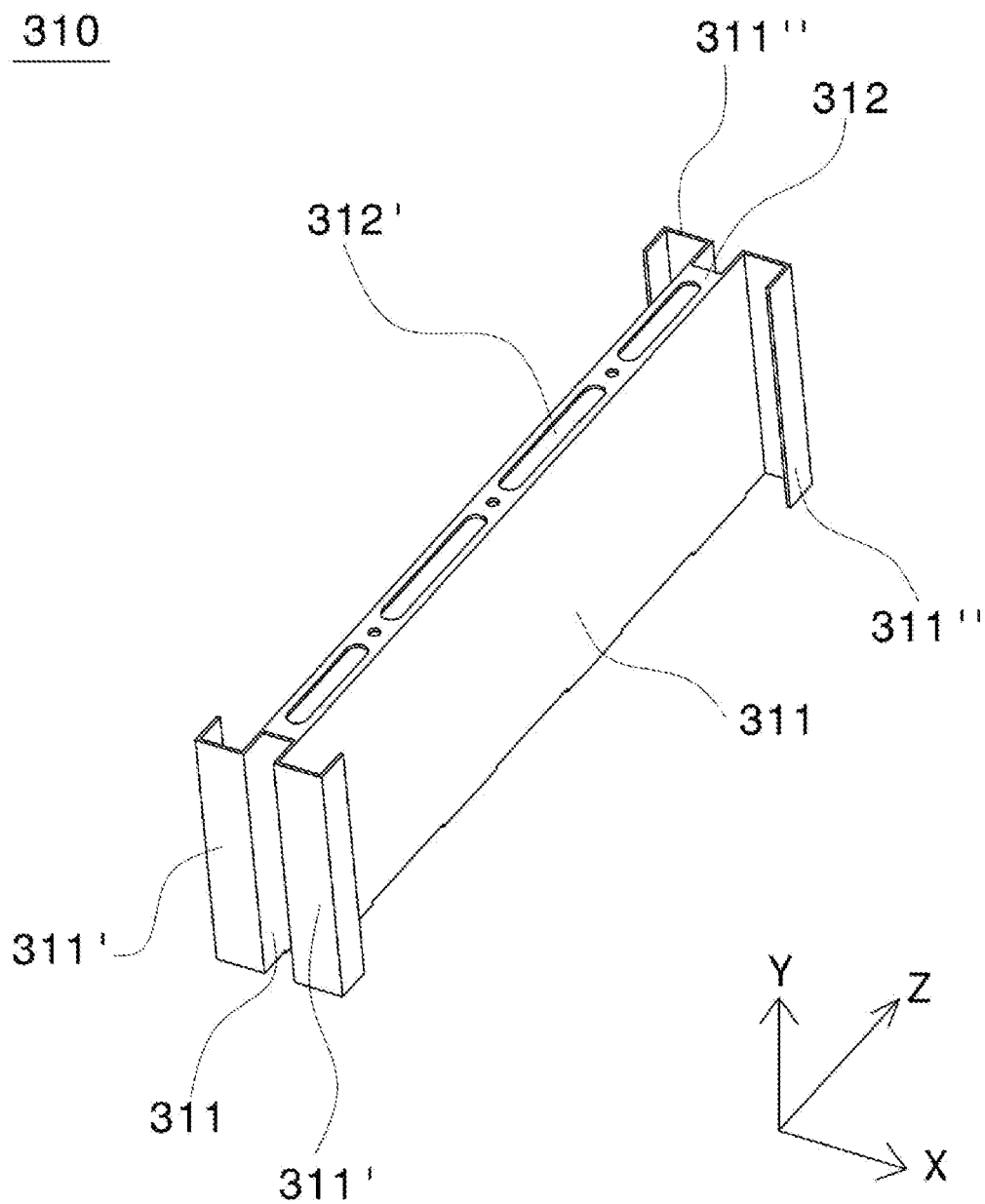

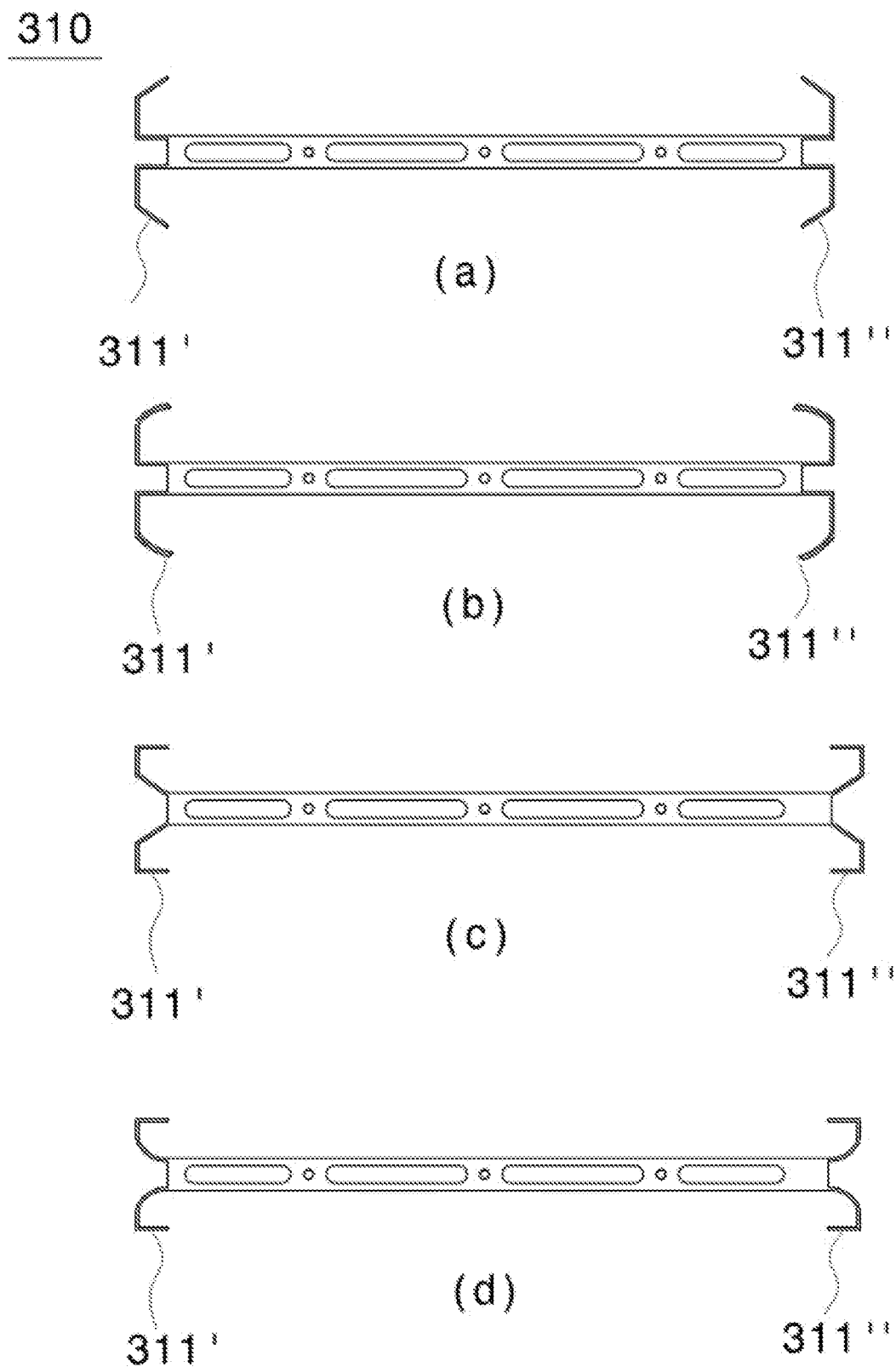
[FIG. 9]

[FIG. 10]
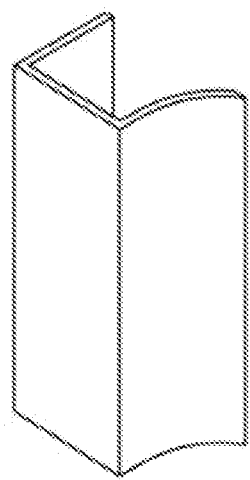
(a)
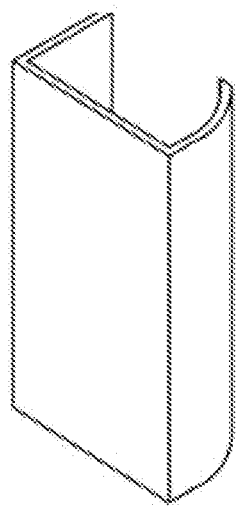
(b)
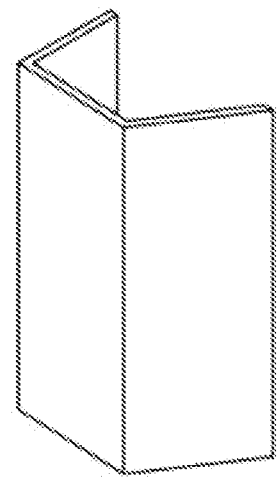
(c)
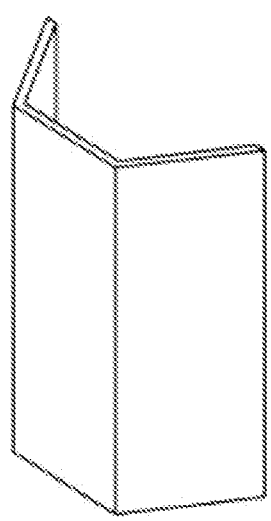
(d)
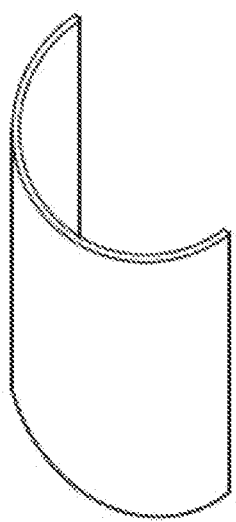
(e)

[FIG. 11]
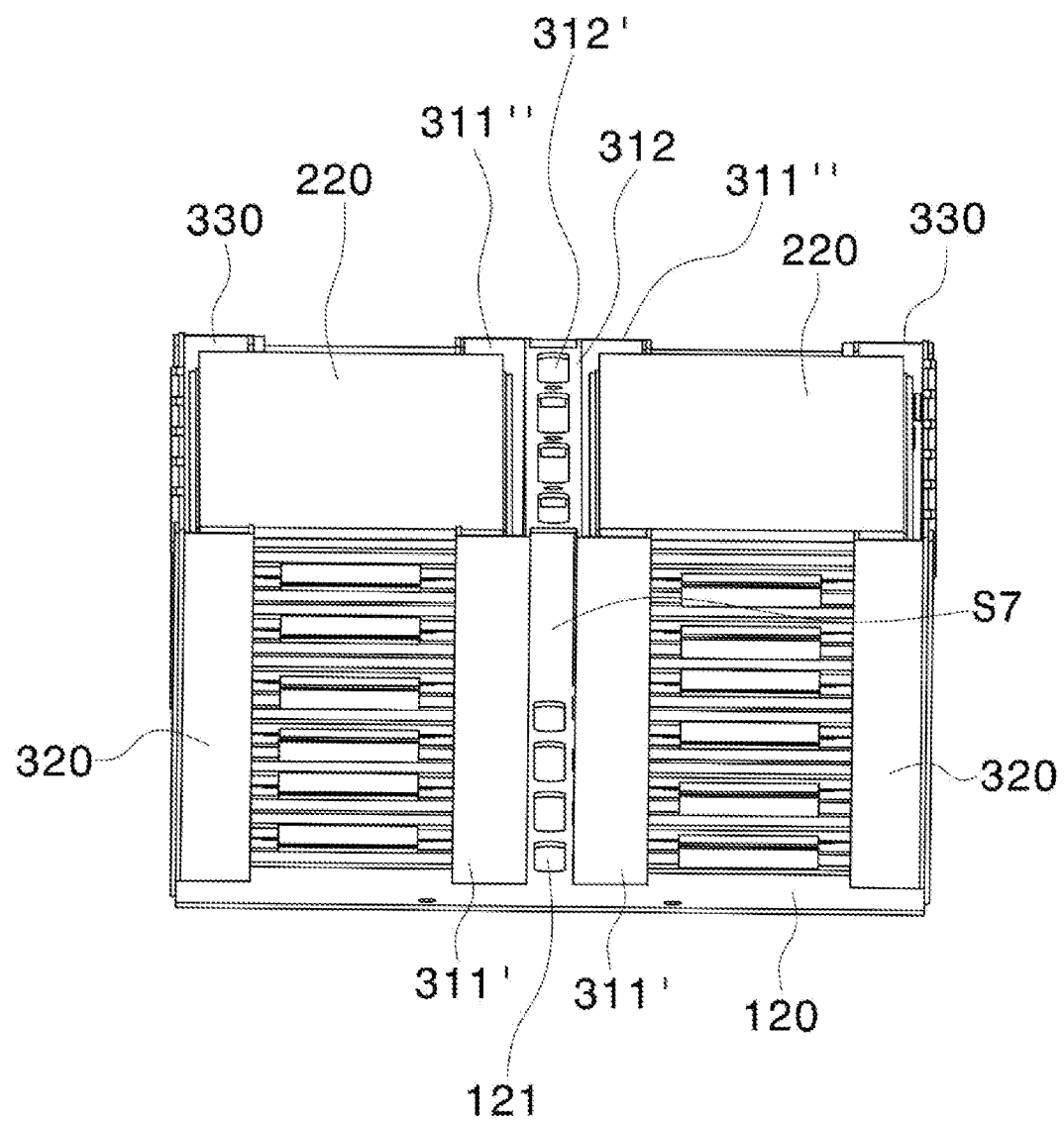

[FIG. 12]
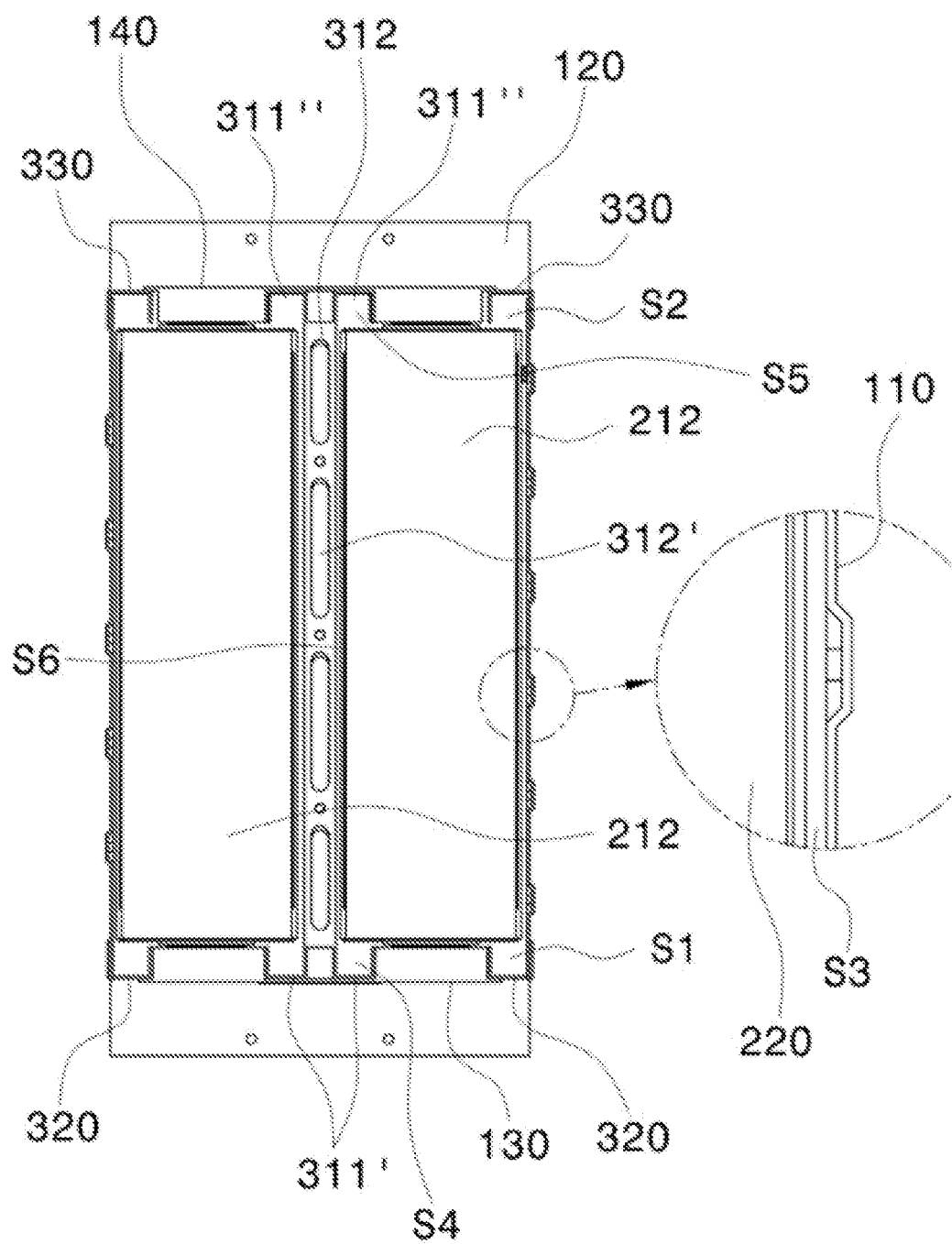

[FIG. 13]
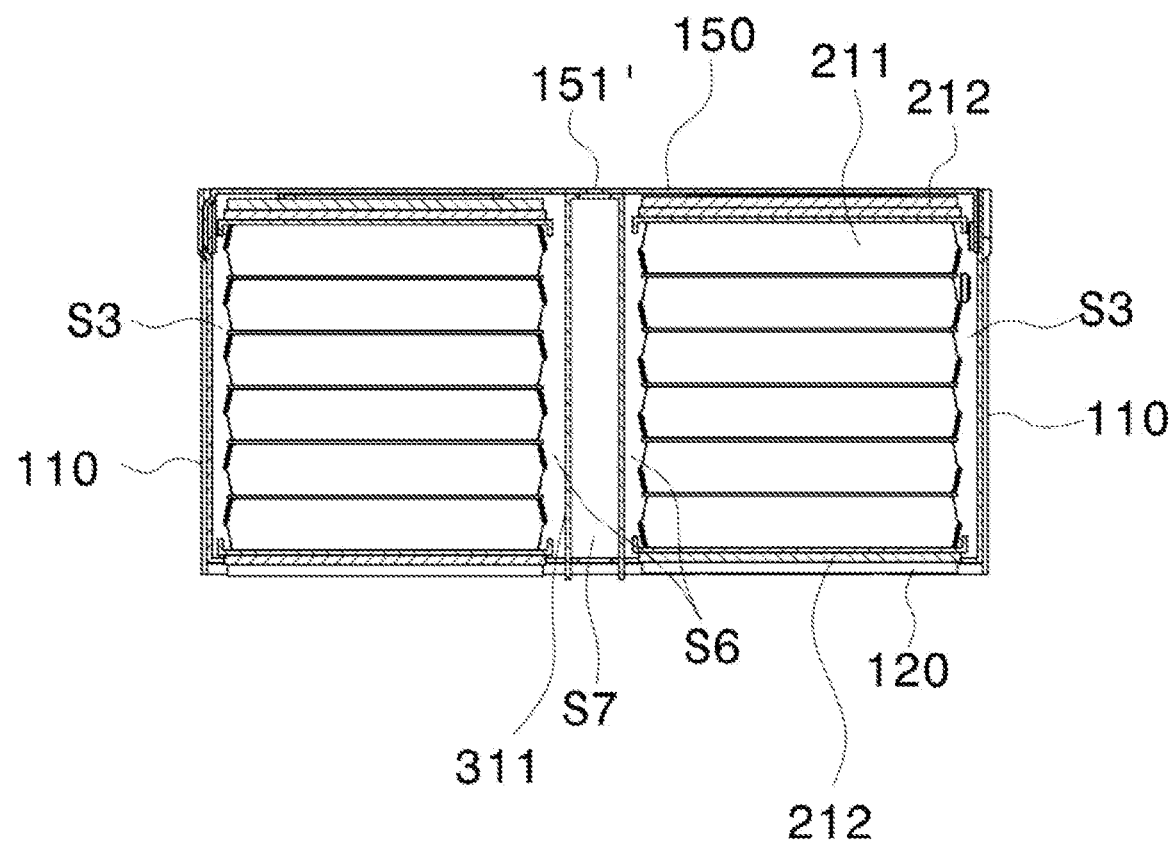

[FIG. 14]
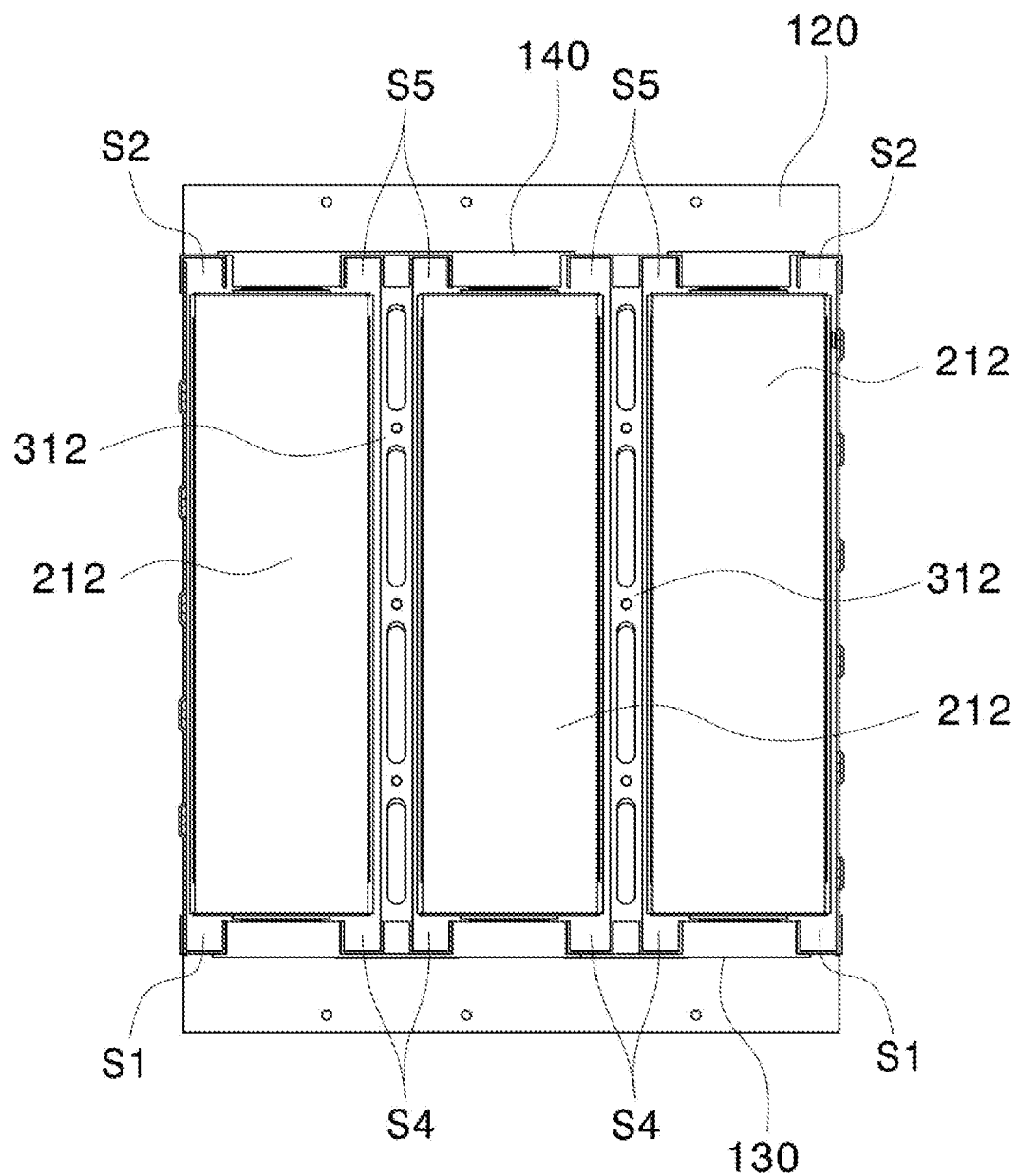

[FIG. 15]
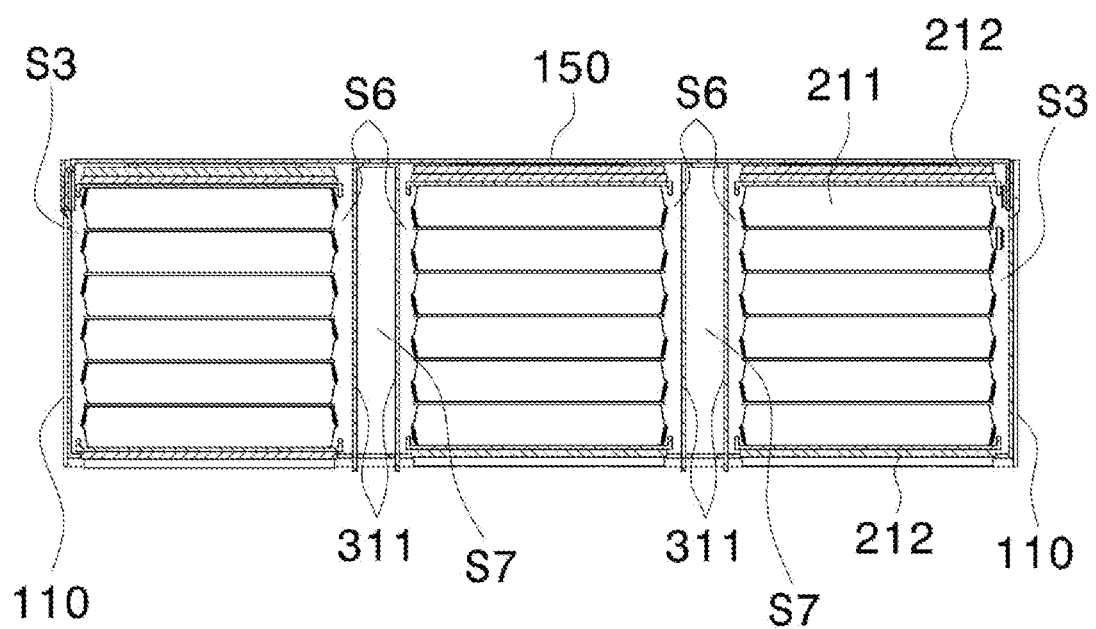

BATTERY MODULE HAVING PARTITION WALL AND THERMAL INSULATION LAYER FOR FIRE INHIBITION

TECHNICAL FIELD

This application claims the benefit of priority to Korean Patent Application No. 2020-0079313 filed on Jun. 29, 2020, the disclosure of which is incorporated herein by reference in its entirety.

The present invention relates to a battery module having a partition wall and a thermal insulation layer for fire inhibition, and more particularly to a battery module configured such that a partition wall and an air thermal insulation layer are provided between cell stacks or between a cell stack and a side cover, whereby ignition conditions are prevented and thus outbreak of fire is inhibited, and, even when fire breaks out, transfer of the fire to a neighboring cell stack is prevented.

BACKGROUND ART

Secondary batteries, which have high applicability to products and electrical properties, such as high energy density, have generally been used in electric vehicles (EV) or hybrid electric vehicles (HEV), each of which is driven using an electrical driving source, as well as portable devices. Such secondary batteries have attracted attention as a new energy source capable of increasing environmental friendliness and energy efficiency, since no by-products are generated as the result of use of energy in addition to a primary advantage in that it is possible to remarkably reduce the use of fossil fuels.

There are a lithium ion battery, a lithium polymer battery, a nickel-cadmium battery, a nickel-hydride battery, and a nickel-zinc battery as secondary batteries. A plurality of battery cells may be connected to each other in series or in parallel to constitute a battery module or a battery pack.

An energy storage system (ESS), which has attracted attention in recent years, is an apparatus that stores produced electricity in a battery in order to supply the electricity to consumers when needed, thereby maximizing electric power use efficiency.

In a general energy storage system (ESS), a plurality of battery modules constitutes a single rack, and several tens to hundreds of racks are combined to constitute a single system. In addition, the energy storage system is used in a state of being interlocked with an uninterruptible power supply (UPS) configured to stably supply electric power in response to abrupt power supply interruption or abnormality or a photovoltaic power system, which is a power generation apparatus configured to convert sunlight into electrical energy.

Meanwhile, although a secondary battery has excellent electrical properties, components constituting the battery, such as an active material or an electrolyte, are decomposed in an abnormal operation state, such as overcharging, over-discharging, exposure to high temperature, or electrical short circuit, whereby heat and gas are generated. As a result, a swelling phenomenon, i.e. expansion of the secondary battery, occurs. The swelling phenomenon accelerates decomposition, which causes explosion or ignition of the secondary battery due to thermal runaway.

That is, when thermal runaway occurs in a battery cell, flare, which is flame ejected from a weakly sealed portion like a flash, spark, which is a particle having heat discharged due to separation of an inner electrode and melting of an aluminum current collector, and high-temperature vent gas are generated. In particular, these substances do not stay at the positions at which they are generated but move to a neighboring module, including battery cells located therearound, whereby there is a high possibility of a major accident.

In connection therewith, Patent Document (Korean Patent Application Publication No. 2020-0011816) discloses a battery pack including a plurality of battery cells arranged such that main surfaces of the battery cells face each other; and a partition wall interposed between neighboring ones of the battery cells, wherein the partition wall is provided with an air pocket engraved so as to be concave in a direction distant from the main surface of each of the battery cells in a thickness direction of the partition wall.

In the above prior art document, the partition wall and the air pocket are formed between neighboring battery cells, whereby it is possible to interrupt thermal interference between the neighboring battery cells, and therefore it is possible to somewhat interrupt thermal runaway from some degraded battery cells to other battery cells adjacent thereto.

However, the prior art document, which relates to a battery pack in which prismatic cells are stacked side by side, is not applicable to a battery module constituted by pouch-shaped cells, each of which includes a cell case and an electrode assembly and which is configured such that leads protrude outwards from the case, without change. Furthermore, air is captured in a thermal insulation layer, and therefore the thermal insulation layer does not properly function when thermal runaway occurs in a cell, whereby heat is easily transferred to a neighboring cell and thus the fire spreads.

PRIOR ART DOCUMENT (Patent Document 1) Korean Patent Application Publication No. 2020-0011816

DISCLOSURE

Technical Problem

The present invention has been made in view of the above problems, and it is an object of the present invention to provide a battery module capable of interrupting movement of flare and spark generated when thermal runaway occurs in a battery cell, thereby preventing outbreak of fire or preventing spread of fire to a neighboring cell stack.

It is another object of the present invention to provide a battery module capable of rapidly discharging air in a module case together with vent gas ejected when thermal runaway occurs in a battery cell, thereby preventing outbreak of fire.

It is a further object of the present invention to provide a battery module capable of inhibiting movement of heat generated when thermal runaway occurs in a battery cell to a neighboring cell stack and discharging heat to the outside together with vent gas, thereby preventing outbreak of fire.

Technical Solution

In order to accomplish the above objects, a battery module according to the present invention has a protective case, a cell module assembly including two or more cell stacks in the protective case, each of the two or more cell stacks having a plurality of battery cells is stacked in a vertical direction, and one more partition walls are provided in at least one of between neighboring ones of the two or more cell stacks and between the two or more cell stacks and the protective case.

Also, in the battery module according to the present invention, the one or more partition walls between the two or more cell stacks is a first partition wall may be provided between the neighboring ones of the cell stacks, and the first partition wall may include a pair of vertical partition walls and spaced apart from each other by a predetermined distance, each of the vertical partition walls having a flat shape, and a connection wall configured to connect upper ends of the vertical partition walls to each other, the connection wall being provided with one or more opening holes.

Also, in the battery module according to the present invention, the protective case may include a pair of side covers disposed so as to face each other, a lower cover configured to connect lower ends of the side covers to each other, a front cover, a rear cover, and an upper cover seated on the side covers.

Also, in the battery module according to the present invention, each of the vertical partition walls may be provided at opposite side ends thereof with a first bent wall and a second bent wall bent or curved in a direction toward one of the two or more cell stacks located adjacent thereto.

Also, in the battery module according to the present invention, the first bent wall and the second bent wall may form a fourth space portion and a fifth space portion, respectively.

Also, in the battery module according to the present invention, the vertical partition wall and the cell stack may be spaced apart from each other by a predetermined distance to form a sixth space portion.

Also, in the battery module according to the present invention, a second partition wall having an open surface may be provided at a first side corner of one of the cell stacks adjacent to each of the two or more side covers, the second partition wall being configured to form a first space portion (S1), and an open surface of the second partition wall may be located so as to face a second side corner of each cell stack.

Also, in the battery module according to the present invention, a third partition wall having an open surface may be provided at a third side corner of one of the two or more cell stacks adjacent to each of the side covers, the third partition wall being configured to form a second space portion, and an open surface of the third partition wall may be located so as to face the open surface of the second partition wall.

Also, in the battery module according to the present invention, a third space portion (S3) may be provided between each of the side covers and one of the two or more cell stacks.

Also, in the battery module according to the present invention, each cell stack of the two or more cell stacks may include a plurality of battery cells, a first busbar configured to allow negative electrode leads of the battery cells to be connected thereto, and a second busbar-configured to allow positive electrode leads of the battery cells to be connected thereto, and neighboring ones of the two or more cell stacks may be connected to each other via a connection busbar.

Also, in the battery module according to the present invention, the front cover may include a front plate and a first depressed portion, the first depressed portion may be located at each of opposite sides of the front plate in a state of being depressed toward the front surface of the cell stack by a predetermined depth, and the first depressed portion may be provided with first slits configured to allow the negative electrode leads of the battery cells to extend therethrough.

Also, in the battery module according to the present invention, the entire surface of the first depressed portion may be hermetically sealed excluding the first slits.

Also, in the battery module according to the present invention, each of the first slits may be formed by a first inclined plate-inclined at a predetermined angle.

Also, in the battery module according to the present invention, the rear cover may include a rear plate and a second depressed portion, the second depressed portion may be located at each of opposite sides of the rear plate in a state of being depressed toward the rear surface of the cell stack by a predetermined depth, and the second depressed portion may be provided with second slits configured to allow the positive electrode leads of the battery cells to extend therethrough.

Also, in the battery module according to the present invention, the entire surface of the second depressed portion may be hermetically sealed excluding the second slits.

Also, in the battery module according to the present invention, each of the second slits may be formed by a second inclined plate inclined at a predetermined angle.

Also, in the battery module according to the present invention, each of the pair of side covers may be provided in the upper end thereof with a fastening recess protruding outwards, the upper cover may include a main plate located in a horizontal direction and an auxiliary plate bent downwards from the main plate, the main plate may be provided with a second perforated portion, and the auxiliary plate may be provided on the outer surface thereof with a fastening protrusion configured to be received in the fastening recess.

Also, in the battery module according to the present invention, the second perforated portion may be located immediately above the connection wall of the first partition wall.

Also, in the battery module according to the present invention, the lower cover may be provided with a first perforated portion, and the first perforated portion may be located immediately under the connection wall of the first partition wall.

In addition, the present invention provides a battery pack including the battery module.

In addition, the present invention provides an energy storage system including the battery module.

Advantageous Effects

A battery module according to the present invention has an advantage in that a vertical partition wall and a bent wall are located between cell stacks, whereby it is possible to interrupt movement of flare and spark generated at the time of thermal runaway to a neighboring cell stack or a neighboring electrode lead, and therefore it is possible to prevent fire outbreak of the battery module.

In addition, the battery module according to the present invention has a merit in that second and third partition walls are located between a side cover and a cell stack so as to face each other, whereby it is possible to interrupt movement of flare and spark generated at the time of thermal runaway to a neighboring cell stack or a neighboring electrode lead, and therefore it is possible to prevent fire outbreak.

Furthermore, the battery module according to the present invention has an advantage in that it is possible to rapidly discharge vent gas ejected at the time of thermal runaway to the outside, and this time it is also possible to discharge air together with the vent gas, whereby it is possible to prevent occurrence of flame.

DESCRIPTION OF DRAWINGS

FIG. 1 is an external perspective view of a battery module according to a first preferred embodiment of the present invention when viewed in a direction toward one side of the battery module.

FIG. 2 is an external perspective view of the battery module according to the first preferred embodiment of the present invention when viewed in a direction toward the other side of the battery module.

FIG. 3 is an exploded perspective view illustrating a coupling structure between a lower cover and an upper cover of the battery module shown in FIG. 1.

FIG. 4 is an exploded perspective view illustrating a coupling structure between a front cover and a rear cover of the battery module shown in FIG. 1.

FIG. 5 is a view illustrating the front cover viewed at various angles.

FIG. 6 is a view illustrating the rear cover viewed at various angles.

FIG. 7 is an exploded perspective view illustrating a coupling structure between partition walls of the battery module shown in FIG. 1.

FIG. 8 is an enlarged perspective view of a first partition wall.

FIG. 9 is a sectional view showing various modifications of the first partition wall.

FIG. 10 is a perspective view showing various modifications of a third partition wall.

FIG. 11 is a perspective view of the battery module shown in FIG. 1 when viewed from the front in the state in which the front cover and the upper cover are removed therefrom.

FIG. 12 is a plan view of the battery module shown in FIG. 1 when viewed from above in the state in which the upper cover is removed therefrom.

FIG. 13 is a sectional view taken along line A-A' of FIG. 1.

FIG. 14 is a plan view of a battery module according to a second preferred embodiment of the present invention when viewed from above in the state in which an upper cover is removed therefrom.

FIG. 15 is a sectional view of the battery module according to the second preferred embodiment of the present invention taken in a lateral direction.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a battery module having a partition wall and a thermal insulation layer for fire inhibition according to the present invention will be described with reference to the accompanying drawings.

FIG. 1 is an external perspective view of a battery module according to a first preferred embodiment of the present invention when viewed in a direction toward one side of the battery module, FIG. 2 is an external perspective view of the battery module according to the first preferred embodiment of the present invention when viewed in a direction toward the other side of the battery module, and FIG. 3 is an exploded perspective view illustrating a coupling structure between a lower cover and an upper cover of the battery module shown in FIG. 1.

As shown in FIGS. 1 to 3, the battery module according to the first embodiment of the present invention is configured to have a structure in which a cell module assembly 200 and a partition wall 300 are received in a protective case 100 having an approximately hexahedral shape, the protective case being made of a metal material.

In the cell module assembly 200, a plurality of battery cells 211 is stacked in a vertical direction to constitute a cell stack 210, and two cell stacks 210 are located side by side in a state of being spaced apart from each other by a predetermined distance.

The partition wall 300 is configured to interrupt or inhibit movement of flare, spark, vent gas, and heat generated when an event occurs in a specific cell to a neighboring cell stack and at the same time to guide discharge of air with which the interior of the protective case 100 is filled. That is, a first partition wall 310 is located between neighboring cell stacks 210, and a second partition wall 320 and a third partition wall 330 are provided between the cell stacks 210 and the protective case 100. A detailed description related thereto will be described below.

Meanwhile, the protective case 100 is configured to physically protect the cell module assembly 200 received therein, and includes a pair of side covers 110 disposed so as to face each other in a state of being spaced apart from each other by a distance slightly greater than the width (X-axis direction) of the cell module assembly 200, a lower cover 120 configured to connect lower ends of the pair of side covers 110 to each other, a front cover 130, a rear cover 140, and an upper cover 150 seated on the pair of side covers 110.

A plurality of fastening recesses 111 protruding outwards is provided in the upper end of each of the side covers 110, which has an approximately flat shape and which is configured to protect a corresponding side surface of the cell module assembly 200, and the lower cover 120 is connected to lower ends of the pair of side covers 110.

The pair of side covers 110 and the lower cover 120 may be separately formed and may then be joined to each other using a well-known joining method, or may be manufactured in an integrated state using a well-known method, such as molding.

The upper cover 150, which is configured to protect the upper part of the cell module assembly 200, includes a main plate 151 located horizontally and an auxiliary plate 152 bent from the main plate 151 toward the lower cover 120.

Here, fastening protrusions 152', which are received in the fastening recesses 111 of the side cover 110, are provided on the outer surface of the auxiliary plate 152.

Meanwhile, a second perforated portion 151' is formed in the middle of the main plate 151 of the upper cover 150, more specifically in the portion of the main plate 151 to which the first partition wall 310 extends vertically upwards, in a longitudinal direction (Z-axis direction). When an event occurs, the second perforated portion 151' serves as a passage configured to allow vent gas and heat to be discharged therethrough. In particular, when high-pressure vent gas is discharged, air in the protective case 100 is discharged together with the vent gas, whereby it is possible to prevent outbreak of fire.

When all conditions, such as a combustible material, oxygen, and temperature higher than the ignition point, are satisfied, fire breaks out in the battery module. Since heat as well as air in the protective case 100 is discharged to the outside via the second perforated portion 151' of the main plate 151, as described above, outbreak of fire is inhibited.

Here, it is preferable for the second perforated portion 151' to be formed such that slits and circular holes are alternately arranged. The reason for this is that it is necessary for the second perforated portion to correspond to an opening hole 312' formed in a connection wall 312 of the first partition wall 310, a description of which will follow.

In addition, it is more preferable for the lower cover 120 to also be provided with a first perforated portion 121 configured to guide discharge of air and heat, which is the same function as the second perforated portion 151', in the longitudinal direction (Z-axis direction).

FIG. 4 is an exploded perspective view illustrating a coupling structure between the front cover and the rear cover of the battery module shown in FIG. 1, FIG. 5 is a view illustrating the front cover viewed at various angles, and FIG. 6 is a view illustrating the rear cover viewed at various angles.

Referring to FIGS. 4 to 6, the front cover 130 is located in a direction in which electrode leads of the cell stacks 210 at one side thereof protrude, and the rear cover 140 is located in a direction in which electrode leads of the cell stacks at the other side thereof protrude. The front cover 130 and the rear cover 140 fix busbars, perform electrical insulation between the protective case 100 and the busbars, and protect the cell stacks 210 from external impact applied from the front and the rear.

First, the front cover 130, which is made of a heat-resistant plastic material, will be described in detail. The front cover 130 includes a front plate 131 and a pair of first depressed portions 132 formed at positions slightly spaced apart from opposite edges of the front plate 131, each of the first depressed portions having a predetermined width, height, and depth toward the front surface of the cell stack 210.

Here, the reason that the first depressed portions 132 are formed at positions slightly spaced apart from opposite edges of the front plate 131 is that it is necessary for the front cover 130 to be in close contact with the second partition wall 320. A detailed description thereof will be given below.

Meanwhile, each of the first depressed portions 132 is provided with first slits 132', through which the electrode leads of the battery cells 211 extend. It is preferable for the first slits 132' to be formed by a plurality of first inclined plates 132" inclined downwards at a predetermined angle in a direction toward the outer surface of the front cover 130 in order to maximally interrupt movement of flame generated around the electrode leads of the battery cells to the outside through the first slits 132'. In other words, the entire surface of the first depressed portion 132 is hermetically sealed excluding the first slits 132'.

Next, the rear cover 140, which is made of a heat-resistant plastic material, will be described. The rear cover 140 is similar in construction and function to the front cover 130 described above.

The rear cover 140 includes a rear plate 141 and a pair of second depressed portions 142 formed at positions slightly spaced apart from opposite edges of the rear plate 141, each of the second depressed portions 142 having a predetermined width, height, and depth toward the rear surface of the cell stack 210.

The reason that the second depressed portions 142 are formed at positions slightly spaced apart from opposite edges of the rear plate 141, similarly to the front plate 131, is that it is necessary for the rear cover 140 to be in close contact with the third partition wall 330. A detailed description thereof will be given below.

Each of the second depressed portions 142 is provided with second slits 142', through which the electrode leads of the battery cells 211 extend. It is preferable for the second slits 142' to be formed by a plurality of second inclined plates 142" inclined upwards at a predetermined angle in a direction toward the outer surface of the rear cover 140 in order to maximally interrupt movement of flame generated around the electrode leads of the battery cells to the outside through the second slits 142'. The entire surface of the second depressed portion 142 is also hermetically sealed excluding the second slits 142'.

Meanwhile, the cell module assembly 200 includes two cell stacks 210 and a connection busbar 220 configured to electrically connect the cell stacks 210 to each other.

First, the cell stack 210 includes a plurality of battery cells 211 stacked in the vertical direction, a pad 212 provided at each of the upper part and the lower part of the stacked battery cells 211, a first busbar 213 configured to electrically connect leads of one side of battery cells 211 located at a relatively upper part of one cell stack 210, and a second busbar 214 configured to electrically connect leads of the other side of battery cells 211.

The battery cell 211 may be a pouch-shaped battery cell, and includes a cell case configured to receive an electrode assembly (not shown) therein and a pair of electrode leads.

Here, the electrode assembly may be a jelly-roll type assembly, which is configured to have a structure in which a long sheet type positive electrode and a long sheet type negative electrode are wound in the state in which a separator is interposed therebetween, a stacked type assembly, which is configured to have a structure in which a rectangular positive electrode and a rectangular negative electrode are stacked in the state in which a separator is interposed therebetween, a stacked and folded type assembly, which is configured to have a structure in which unit cells are wound using a long separation film, or a laminated and stacked type assembly, which is configured to have a structure in which battery cells are stacked in the state in which a separator is interposed therebetween and are then attached to each other. However, the present invention is not limited thereto.

Also, it is obvious that an electrolyte may be replaced by a solid electrolyte or a gel type quasi-solid electrolyte obtained by adding an additive to a solid electrolyte, the gel type quasi-solid electrolyte having an intermediate phase between a liquid and a solid, in addition to a liquid electrolyte, which is commonly used.

The electrode assembly is received in the cell case, and the cell case is generally configured to have a laminate sheet structure including an inner layer, a metal layer, and an outer layer. The inner layer is disposed in direct contact with the electrode assembly, and therefore the inner layer must exhibit high insulation properties and high resistance to an electrolytic solution. In addition, the inner layer must exhibit high sealability in order to hermetically seal the cell case from the outside, i.e. a thermally-bonded sealed portion between inner layers must exhibit excellent thermal bonding strength. The inner layer may be made of a material selected from among a polyolefin-based resin, such as polypropylene, polyethylene, polyethylene acrylate, or polybutylene, a polyurethane resin, and a polyimide resin, which exhibit excellent chemical resistance and high sealability. However, the present invention is not limited thereto, and polypropylene, which exhibits excellent mechanical-physical properties, such as tensile strength, rigidity, surface hardness, and resistance to impact strength, and excellent chemical resistance, is the most preferably used.

The metal layer, which is disposed so as to abut the inner layer, corresponds to a barrier layer configured to prevent moisture or various kinds of gas from permeating into the battery from the outside. An aluminum thin film, which is light and easily shapeable, may be used as a preferred material for the metal layer.

The outer layer is provided on the other surface of the metal layer. The outer layer may be made of a heat-resistant polymer that exhibits excellent tensile strength, resistance to moisture permeation, and resistance to air transmission such that the outer layer exhibits high heat resistance and chemical resistance while protecting the electrode assembly. As an example, the outer layer may be made of nylon or polyethylene terephthalate. However, the present invention is not limited thereto.

Meanwhile, the pair of electrode leads is constituted by a positive electrode lead and a negative electrode lead, which may be exposed outwards from the cell case in a state of being electrically connected to a positive electrode tab and a negative electrode tab of the cell assembly, respectively, or may be directly connected to the cell assembly in the state in which the tabs are omitted.

The pads 212 allow the stacked battery cells 211 to be in close contact with each other in a normal state, and absorb expanded volume of the battery cells at the time of swelling. Also, it is preferable for the pad to be made of a material that exhibits low thermal conductivity, more specifically a material that exhibits high elasticity, high insulation, and low thermal conductivity, such as extended polypropylene (EPP), EDS, or EPDM. However, the material for the pad is not particularly restricted as long as the pad performs the same function.

Of course, in order to securely interrupt transfer of heat to a neighboring cell stack, a thermal insulation layer (not shown) made of a thermal insulation material may be further provided at the lower cover 120 and the upper cover 150 in tight contact therewith.

Although a pair of pads 212 is provided in order to cover the lowermost layer and the uppermost layer of the battery cells 211 in the figures, which is an illustration, the pads may be provided between the battery cells 211 as needed.

Each of the first busbar 213 and the second busbar 214, which are configured to electrically connect the leads of the battery cells 211 to each other, is a flat metal plate having slits, through which the leads extend, formed therein.

The connection busbar 220 includes a pair of third busbars 221 and a connection bar 222. Specifically, the third busbar 221 fixes the other leads of one cell stack 210 that are not connected via the first busbar 213, and the pair of third busbars 221 may be connected to each other via the connection bar 222, whereby neighboring cell stacks 210 may be connected to each other in series or in parallel.

An assembly process of the cell module assembly 200 having the above construction will be briefly described. The cell stack 210, configured such that the pad 212, the plurality of battery cells 211, and the pad 212 are stacked in that order, is prepared, and the leads of the battery cells 211, e.g. the leads of the battery cells that face in a forward direction, extend through the first slits 132' of the front cover 130.

Subsequently, the upper leads extend through the slits of the first busbar 213 and are then bent, and the lower leads extend through the slits of the third busbar 221 of the connection busbar 220 and are then bent. Subsequently, the leads are fixed through a well-known joining means, such as welding.

At this time, since the first busbar 213 and the third busbar 221 are fastened in a state of being seated in the first depressed portion 132 of the front cover 130, volumetric increase due to the first busbar 213 and the third busbar 221 may be minimized. In addition, since each of the pair of third busbars 221 has a structure in which three sides are connected to each other at a right angle and one side is open so as to correspond to the outer shape of the front cover 130 and the third busbars are connected to each other via the connection bar 222, the neighboring cell stacks 210 remain electrically connected to each other.

The leads of the battery cells 211 that face rearwards sequentially extend through the second slits 142' of the rear cover 140 and the slits of the second busbar 214 and are then bent. Subsequently, the leads are fixed through a well-known means, such as welding. At this time, since the second busbar 214 is seated in the second depressed portion 142 of the rear cover 140, volumetric increase may also be minimized.

FIG. 7 is an exploded perspective view illustrating a coupling structure between the partition walls of the battery module shown in FIG. 1, and FIG. 8 is an enlarged perspective view of the first partition wall.

When thermal runaway occurs in a specific battery cell, flare, spark, high-pressure vent gas, and heat are ejected, and, when oxygen and a combustible material coexist therewith, fire breaks out or explosion occurs.

The partition wall 300 according to the present invention is configured to interrupt movement of thermal runaway products, such as flare and spark, to a neighboring cell stack 210 and at the same time to prevent the protective case 100 from protruding outwards. Furthermore, the partition wall is configured to guide discharge of vent gas and heat to the second perforated portion 151' of the upper cover 150 and the first perforated portion 121 of the lower cover 120. Since air with which the interior of protective case 100 is filled is discharged together in this process, no flame is generated.

Referring to FIGS. 3, 7, and 8, the partition wall 300 configured to perform the above function includes a first partition wall 310 located between the cell stacks 210, second partition walls 320 located in the vicinity of the corners of one side of the cell stacks 210, and third partition walls 330 located in the vicinity of the corners of the other side of the cell stacks 210.

First, the first partition wall 310, which is interposed between the cell stacks 210 adjacent to each other and is located slightly spaced apart from the cell stacks 210, fundamentally interrupts movement of flare and spark to a neighboring cell stack 210, prevents ejection of the flare and the spark to the front surface or the rear surface of the protective case 100, and guides movement of vent gas, heat, and air in the vertical direction.

Specifically, the first partition wall 310 includes a pair of vertical partition walls 311 erected so as to face each other in a state of being spaced apart from each other by a predetermined distance and a connection wall 312 configured to connect upper ends of the vertical partition walls 311 to each other.

Here, the length (Z-axis direction) of the vertical partition wall 311 is similar to the length of the battery cell 211, and the height of the vertical partition wall is set to such an extent that the vertical partition wall is in close contact with the upper cover 150. That is, the vertical partition wall has the shape of an approximately flat plate.

The connection wall 312 is configured to connect the pair of vertical partition walls 311 to each other while supporting the pair of vertical partition walls and to rapidly guide vent gas to the outside. One or more opening holes 312' are formed in the connection wall 312. The upper cover 150, which is an upward vertical extension line of the connection wall 312, is provided with a second perforated portion 151', and the lower cover 120, which is a downward vertical extension line of the connection wall 312, is provided with a first perforated portion 121.

It is preferable for a first bent wall 311' and a second bent wall 311" to be further provided at opposite side ends of the vertical partition wall 311, i.e. in the vicinity of opposite side corners of the cell stacks 210. Each of the first bent wall 311' and the second bent wall 311" may have a shape in which one side surface is open and two sides are connected to each other at a right angle.

Movement of flare and spark to a neighboring cell stack 210 is interrupted by the provision of the vertical partition walls 311. Since the interrupted flare and spark may move to the vicinity of the front cover 130 or the rear cover 140 at which the leads of the battery cells 211 are located, however, there is still a possibility of ignition.

In the case in which the first bent wall 311' and the second bent wall 311", each of which has a shape in which two sides are connected to each other at a right angle, are located at opposite side ends of the vertical partition wall 311 so as to face each other, however, the flare and spark primarily interrupted by the vertical partition wall 311 are captured by the first bent wall 311' and the second bent wall 311", whereby the flare and spark do not move in a direction toward the electrode leads.

Next, the second partition wall 320 will be described. The second partition wall 320, which is located in the vicinity of one side corner of the cell stack 210, more specifically in the vicinity of the corner at which the side cover 110 and the front cover 130 join each other, is configured to interrupt movement of flare and spark in the direction toward the electrode leads after colliding with the side cover 110 and at the same time to secure a space portion by which the side cover 110 and the cell stack 210 are spaced apart from each other.

That is, the second partition wall 320 has a shape in which one side surface is open and three sides are connected to each other at a right angle, and the open surface is disposed so as to face electrode leads located opposite thereto.

Meanwhile, the third partition wall 330 is identical in shape to the second partition wall 320, and the third partition wall is identical in construction and function to the second partition wall except that the third partition wall is located in the vicinity of the other side corner of the cell stack 210 and only the direction of the open surface is different, and therefore a duplicate description will be omitted.

Movement of the flare and spark primarily interrupted by the side cover 110 is inhibited by the second partition wall 320 and the third partition wall 330, which are located so as to face each other while each of the partition walls has a shape in which three sides are connected to each other at a right angle and one side is open, whereby it is possible to interrupt the flare and spark from coming into direct contact with the electrode leads.

FIG. 9 is a sectional view showing various modifications of the first partition wall. As shown in FIG. 9, the first bent wall 311' and the second bent wall 311" of the first partition wall 310 may be deformed so as to capture flare and spark. That is, each of the first bent wall and the second bent wall may have a shape in which the angle of a bent portion is changed or a curved portion is included, instead of the shape according to the first preferred embodiment in which three sides are connected to each other at a right angle and one side is open.

Of course, in this case, it is obvious that the front cover 130 and the rear cover 140 may also be deformed so as to correspond to the outer shapes of the deformed first bent wall 311' and second bent wall 311".

FIG. 10 is a perspective view showing various modifications of the third partition wall. As shown in FIG. 10, the third partition wall 330 may be deformed so as to capture flare and spark. That is, the third partition wall may have a shape in which the angle of a bent portion is changed or a curved portion is included, instead of the shape according to the first preferred embodiment in which three sides are connected to each other at a right angle and one side is open.

Even in this case, it is obvious that the front cover 130 and the rear cover 140 may also be deformed so as to correspond to the outer shape of the deformed third partition wall 330.

FIG. 11 is a perspective view of the battery module shown in FIG. 1 when viewed from the front in the state in which the front cover and the upper cover are removed therefrom, FIG. 12 is a plan view of the battery module shown in FIG. 1 when viewed from above in the state in which the upper cover is removed therefrom, and FIG. 13 is a sectional view taken along line A-A' of FIG. 1.

Referring to FIGS. 11 to 13, inhibition of ignition of the battery module according to the present invention will be described in detail through a description of a process in which flare, spark, vent gas, heat, and air move when an event, such as thermal runaway, occurs.

The battery module according to the present invention further includes a first space portion S1 to a seventh space portion S7 together with the partition wall 300 described above. Specifically, the first space portion S1 is formed in the second partition wall 320, the second space portion S2 is formed in the third partition wall 330, and the third space portion S3 is formed between the vertical side surface of the cell stack 210 in the longitudinal direction and the side cover 110.

In addition, the fourth space portion S4 and the fifth space portion S5 are formed in the first bent wall 311' and the second bent wall 311", respectively, the sixth space portion S6 is formed between the vertical partition wall 311 and the vertical side surface of the cell stack 210 in the longitudinal direction, and the seventh space portion S7 is formed between the pair of vertical partition walls 311.

For example, on the assumption that thermal runaway occurs in a specific battery cell 211 of a cell stack 210 located on the right side of FIGS. 11 to 13, flare and spark are gathered in one or more of the first space portion S1 to the sixth space portion S6 in an interrupted state, whereby the flare and the spark cannot move to a cell stack 210 located on the left side of the figures.

Since the protective case 100 and the partition wall 300 are not maintained in a perfectly airtight state, vent gas that is generated and air are discharged to the outside through the second perforated portion 151' of the upper cover 150 and the first perforated portion 121 of the lower cover 120 via the front cover 130, the rear cover 140, and the seventh space portion S7.

Meanwhile, transfer of heat to a neighboring cell stack 210 is minimized by the sixth space portion S6 and the seventh space portion S7, which correspond to air thermal insulation layers, and the pads 212, each of which is made of a thermal insulation material, and the heat is discharged to the outside together with the vent gas.

The battery cells 211 constituting the cell stack according to the present invention, each of which is flat, are stacked in the vertical direction, whereby the volume of the cell stack increases when swelling occurs but swelling in a lateral direction is minimized. Consequently, the sixth space portion S6 and the seventh space portion S7 may be maintained as air thermal insulation layers without being affected by swelling.

As a result, even when an event occurs in any one cell stack, air is discharged to the outside together with vent gas, whereby oxygen necessary for ignition is deficient in the protective case, and combustible materials cannot reach a neighboring cell stack and are captured without being discharged to the outside. Furthermore, when the air is discharged, heat is discharged together with the air, whereby the temperature of the cell stack is maintained at lower than the ignition point, and therefore it is possible to prevent outbreak of fire.

Of course, fire may break out in a specific cell stack due to unexpected surrounding situations. However, the air thermal insulation layers corresponding to the sixth space portion S6 and the seventh space portion S7 interrupt transfer of heat to a neighboring cell stack, whereby it is possible to securely prevent outbreak of fire in the neighboring cell stack.

That is, when ambient temperature rises to an abnormal range, the separator of the battery cell shrinks, whereby short circuit occurs. In the present invention, the air blocking layers are provided, and even when air in the air blocking layers is heated, the air is discharged to the second perforated portion of the upper cover due to convection, whereby movement of heat is restricted. Consequently, the vicinity of a neighboring cell stack is maintained at a relatively safe temperature, and therefore it is possible to prevent occurrence of a phenomenon in which the separator shrinks.

FIG. 14 is a plan view of a battery module according to a second preferred embodiment of the present invention when viewed from above in the state in which an upper cover is removed therefrom, and FIG. 15 is a sectional view of the battery module according to the second preferred embodiment of the present invention taken in a lateral direction.

The second embodiment is identical in construction to the first embodiment described above except that the front cover and the rear cover of the protective case are modified and the number of cell stacks received in the battery module is changed.

That is, in the second embodiment, each of the front cover 130 and the rear cover 140 is provided with three first depressed portions and three second depressed portions, and two first partition walls are located between the respective cell stacks.

In the second embodiment of the present invention, three cell stacks are shown; however, it is obvious that four or more cell stacks may be continuously arranged while one first partition wall is located between neighboring ones of the cell stacks.

Meanwhile, the battery module having the above construction may be received in a separate case to constitute a single battery pack, and the battery module or the battery pack may be used in various facilities or devices including large-capacity power sources, such as an energy storage system, an electric vehicle, a hybrid electric vehicle, and a plug-in hybrid electric vehicle.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and technical idea of the present invention, and it will be obvious that such changes and modifications fall within the scope of the appended claims.

DESCRIPTION OF REFERENCE SYMBOLS

100: Protective case
110: Side cover
111: Fastening recess
120: Lower cover
121: First perforated portion
130: Front cover
131: Front plate
132: First depressed portion
132': First slit 132": First inclined plate
140: Rear cover
141: Rear plate
142: Second depressed portion
142': Second slit 142": Second inclined plate
150: Upper cover
151: Main plate 151': Second perforated portion
152: Auxiliary plate 152': fastening protrusion
200: Cell module assembly
210: Cell stack
211: Battery cell
212: Pad
213: First busbar
214: Second busbar
220: Connection busbar
221: Third busbar 222: Connection bar
300: Partition wall
310: First partition wall
311: Vertical partition wall
311': First bent wall 311": Second bent wall
312: Connection wall
312': Opening hole
320: Second partition wall
330: Third partition wall
S1: First space portion S2: Second space portion
S3: Third space portion S4: Fourth space portion
S5: Fifth space portion S6: Sixth space portion
S7: Seventh space portion

The invention claimed is:

1. A battery module comprising:
a protective case;
a cell module assembly comprising two or more cell stacks in the protective case, each of the two or more cell stacks having a plurality of battery cells stacked in a vertical direction; and
a first partition wall between the two or more cell stacks and between the two or more cell stacks and the protective case,
wherein the first partition wall comprises:

a pair of vertical partition walls disposed so as to face each other and spaced apart from each other by a predetermined distance, each of the vertical partition walls having a flat shape;
a connection wall configured to connect upper ends of the vertical partition walls to each other; and
a first bent wall and a second bent wall extending from opposite vertical side edges of each of the pair of vertical partition walls, the first bent wall and the second bent wall bent or curved toward one of the two or more cell stacks located adjacent thereto.

2. The battery module according to claim 1, wherein the connection wall is provided with one or more opening holes.

3. The battery module according to claim 1, wherein the protective case comprises:
a pair of side covers disposed so as to face each other;
a lower cover configured to connect lower ends of the side covers to each other;
a front cover;
a rear cover; and
an upper cover seated on the side covers.

4. The battery module according to claim 1, wherein the first bent wall and the second bent wall form a fourth space portion and a fifth space portion, respectively.

5. The battery module according to claim 4, wherein the vertical partition wall and the cell stack are spaced apart from each other by a predetermined distance to form a sixth space portion.

6. The battery module according to claim 3, wherein a second partition wall having an open surface is provided at a first side corner of each of the two or more cell stacks adjacent to each of the side covers, the second partition wall being configured to form a first space portion, and
wherein the open surface of the second partition wall is located so as to face a second side corner of each cell stack.

7. The battery module according to claim 6, wherein a third partition wall having an open surface is provided at a third side corner of one of the two or more cell stacks adjacent to each of the side covers, the third partition wall being configured to form a second space portion, and
wherein the open surface of the third partition wall is located so as to face the open surface of the second partition wall.

8. The battery module according to claim 7, wherein a third space portion is provided between each of the side covers and one of the two or more cell stacks.

9. The battery module according to claim 6, wherein each cell stack of the two or more cell stacks comprises:
a first busbar configured to allow negative electrode leads of the battery cells to be connected thereto; and
a second busbar configured to allow positive leads of the battery cells to be connected thereto, and
wherein neighboring ones of the two or more cell stacks are connected to each other via a connection busbar.

10. The battery module according to claim 9, wherein the front cover comprises a front plate and a first depressed portion,
wherein the first depressed portion is located at each of opposite sides of the front plate in a state of being depressed toward a front surface of the cell stack by a predetermined depth, and
wherein the first depressed portion is provided with first slits configured to allow the negative electrode leads of the battery cells to extend therethrough.

11. The battery module according to claim 10, wherein an entire surface of the first depressed portion is hermetically sealed excluding the first slits.

12. The battery module according to claim 11, wherein each of the first slits is formed by a first inclined plate inclined at a predetermined angle.

13. The battery module according to claim 9, wherein the rear cover comprises a rear plate and a second depressed portion,
wherein the second depressed portion is located at each of opposite sides of the rear plate in a state of being depressed toward a rear surface of the cell stack by a predetermined depth, and
wherein the second depressed portion is provided with second slits configured to allow the positive electrode leads of the battery cells to extend therethrough.

14. The battery module according to claim 13, wherein an entire surface of the second depressed portion is hermetically sealed excluding the second slits.

15. The battery module according to claim 14, wherein each of the second slits is formed by a second inclined plate inclined at a predetermined angle.

16. The battery module according to claim 3, wherein each of the pair of side covers is provided in an upper end thereof with a fastening recess protruding outwards,
wherein the upper cover comprises a main plate located in a horizontal direction and an auxiliary plate bent downwards from the main plate,
wherein the main plate is provided with a second perforated portion, and
wherein the auxiliary plate is provided on an outer surface thereof with a fastening protrusion configured to be received in the fastening recess.

17. The battery module according to claim 16, wherein the second perforated portion is located immediately above the connection wall of the first partition wall.

18. The battery module according to claim 3, wherein the lower cover is provided with a first perforated portion, and
wherein the first perforated portion is located immediately under the connection wall of the first partition wall.

19. A battery pack comprising the battery module according to claim 1.

20. An energy storage system comprising the battery module according to claim 1.

* * * * *